United States Patent [19]

Wasylyniuk

[11] Patent Number: 4,684,381
[45] Date of Patent: Aug. 4, 1987

[54] CHEMICAL FILTER FOR USE IN A CAB VENTILATION SYSTEM

[76] Inventor: Ralph E. Wasylyniuk, Box 337, Raymore, Saskatchewan, Canada, S0A 3J0

[21] Appl. No.: 851,944

[22] Filed: Apr. 14, 1986

[51] Int. Cl.⁴ ............................................. B01D 50/00
[52] U.S. Cl. .................................... 55/316; 55/385 B; 55/387; 55/481; 55/482; 55/484; 55/493; 55/502; 98/2.11
[58] Field of Search .................... 55/316, 385 B, 387, 55/385 R, 467, 484, 482, 493, 481, 502, DIG. 29; 98/2.11

[56] References Cited

U.S. PATENT DOCUMENTS

| 2,764,251 | 9/1956 | Jessop | 55/316 |
|---|---|---|---|
| 3,280,541 | 10/1966 | Soltis | 55/493 |
| 3,411,273 | 11/1968 | Duncan et al. | 55/481 |
| 3,423,908 | 1/1969 | Hart | 55/484 |
| 3,861,894 | 1/1975 | Marsh | 55/316 |
| 3,868,896 | 3/1975 | Doll et al. | 98/2.11 |
| 3,884,662 | 5/1975 | Hladik | 55/502 |
| 4,120,527 | 10/1978 | Lawrence | 98/2.11 |
| 4,365,541 | 12/1982 | Marques et al. | 55/504 |
| 4,587,890 | 5/1986 | Hurlburt | 55/385 B |

FOREIGN PATENT DOCUMENTS 1176907 10/1984 Canada ............................... 98/2.11

Primary Examiner—Bernard Nozick
Attorney, Agent, or Firm—Adrian D. Battison

[57] ABSTRACT

A chemical filter for attachment into an inlet housing of a tractor cab ventilation system includes a rectangular housing with a surrounding flange co-planar with one end face so that the flange can be clamped between an abutment face surrounding the inlet opening and a dust filter conventional on the system. One end wall of the housing can be opened for insertion of a particulate absorption material for example activated charcoal.

9 Claims, 4 Drawing Figures

CHEMICAL FILTER FOR USE IN A CAB VENTILATION SYSTEM

BACKGROUND OF THE INVENTION

Cabs of tractors, trucks and the like of course need ventilation to keep the environment satisfactory for what can be very long hours of use during various seasons of the year. For this purpose it is necessary to draw air into the cab for passage through a heating or air conditioning system for properly ventilating the cab with air of suitable temperature. Many cabs have a single air inlet located in a suitable place for example adjacent the roof line and projecting outwardly, forwardly or rearwardly of the cab with an opening facing downwardly. In many cases a dust filter is positioned at the opening so that the air drawn into the cab is free from dust since much farmwork or truck driving is done in dusty areas where the wheels of the vehicle tend to generate dust which is drawn into the cab.

U.S. Pat. Nos. 3,180,244 (Mescher), 4,120,527 (Lawrence), 3,868,896 (Doll) and 4,492,151 (Mattei) show examples of cab design incorporating various filter arrangements.

In particular Mattei discloses an arrangement including a first dust filter following which there is provided an expansion space from which the air passes through a chemical filter of the type using activated charcoal. This arrangement is very bulky and requires a significant number of parts and thus leads to an increased cost.

In addition there are already on the market large numbers of tractor cabs with ventilation systems. In one example there is provided a downwardly directed inlet opening adjacent the roof line of the cab from an inlet chamber which projects rearwardly from the cab. The inlet opening which may be located and oriented in other arrangements is generally rectangular and is closed by a hinged dust filter which defines a rectangular casing shaped to close the opening. The dust filter is arranged to be latched up against a flange surrounding the opening and defining an abutment surface facing downwardly from the opening with a resilient sealing means between the abutment surface and the dust filter so that any air drawn into the chamber passes through the dust filter. Such an arrangement does not include a chemical filter and to date no proposal has been made for simply incorporating a chemical filter into that system in view of the difficulty of placing the filter in the chamber downstream of the filter and upstream of the fan. However more concern has been generated in recent years concerning the toxic chemicals with which farmers work and particularly the various sprays which are currently used. While such sprays are harmless in the finished food product, in concentration there can be significant danger and accordingly there is an increased need and desire to provide a filter which will extract such toxic chemicals from the air as it is drawn into the cab.

SUMMARY OF THE INVENTION

It is one object of the present invention, therefore to provide an improved chemical filter arrangement which can be inserted into a tractor cab ventilation system of the type described above.

According to a first aspect of the invention, therefore, there is provided a chemical filter for use in a cab ventilation system of the type comprising an air inlet chamber having an inlet opening, flange means surrounding the opening and defining an abutment surface facing outwardly of the opening and surrounding the opening, a dust filter having a rectangular casing shaped to close the opening, means mounting the casing such that it can be moved into engagement with the abutment surface and sealing means between the abutment surface and the dust filter such that air drawn into the opening passes through the dust filter, said chemical filter comprising a container with a length and width arranged to fit into the opening inside the flange means, said container having a thickness arranged to receive an absorption material therein, a flange surrounding the container at one face of the container such that the thickness of the container can project into the opening with the flange adjacent said abutment surface, and resilient sealing means mounted on one side of the flange surrounding the container whereby the flange can be inserted between the dust filter and said abutment surface with said resilient sealing means between said abutment surface and said flange and between the flange and the dust filter respectively.

According to a second aspect of the invention, there is provided a cab ventilation system of the type comprising an air inlet chamber having an inlet opening, flange means surrounding the opening and defining an abutment surface facing outwardly of the opening and surrounding the opening, a dust filter having a rectangular casing shaped to close the opening, means mounting the casing such that it can be moved into engagement with the abutment surface and sealing means between the abutment surface and the dust filter such that air drawn into the opening passes through the dust filter, and a chemical filter comprising a container with a length and width arranged to fit into the opening inside the flange means, said container having a thickness arranged to receive an absorption material therein, a flange surrounding the container at one face of the container such that the thickness of the container can project into the opening with the flange adjacent said abutment surface, and resilient sealing means mounted on one side of the flange surrounding the container whereby the flange can be inserted between the dust filter and said abutment surface with said resilient sealing means between said abutment surface and said flange and between the flange and the dust filter respectively.

According to a third aspect of the invention, there is provided a chemical filter for use in a cab ventilation system comprising a container having parallel retangular upper and lower faces spaced by the width of the container and four side walls surrounding the container each of a length substantially greater than the width of the container and a flange co-planar with one of said upper and lower faces and extending outwardly therefrom so as to surround said face, said flange having on a side remote from the side walls a resilient sealing means surrounding said face, said faces including screen means arranged to allow therethrough the passage of air while retaining within the container a chemically absorbent particulate material.

The invention therefore utilizes the relatively simply but unique and ingenious technique of locating the chemical filter directly adjacent the dust filter and mounting it by way of a flange which is trapped between the dust filter and the conventional mounting flange. The chemical filter can include a resilient sealing ring around the flange on the underside thereof so that the flange cooperates with the conventional sealing ring on the abutment surface and provides a further ring for cooperating with the upper edge of the dust filter.

In a further important improvement of the invention, the rectangular chemical filter can include a hinged door at one end that is in one side wall above the flange so that a particulate absorbent material, for example activated charcoal, can be introduced into the container and removed when spent.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
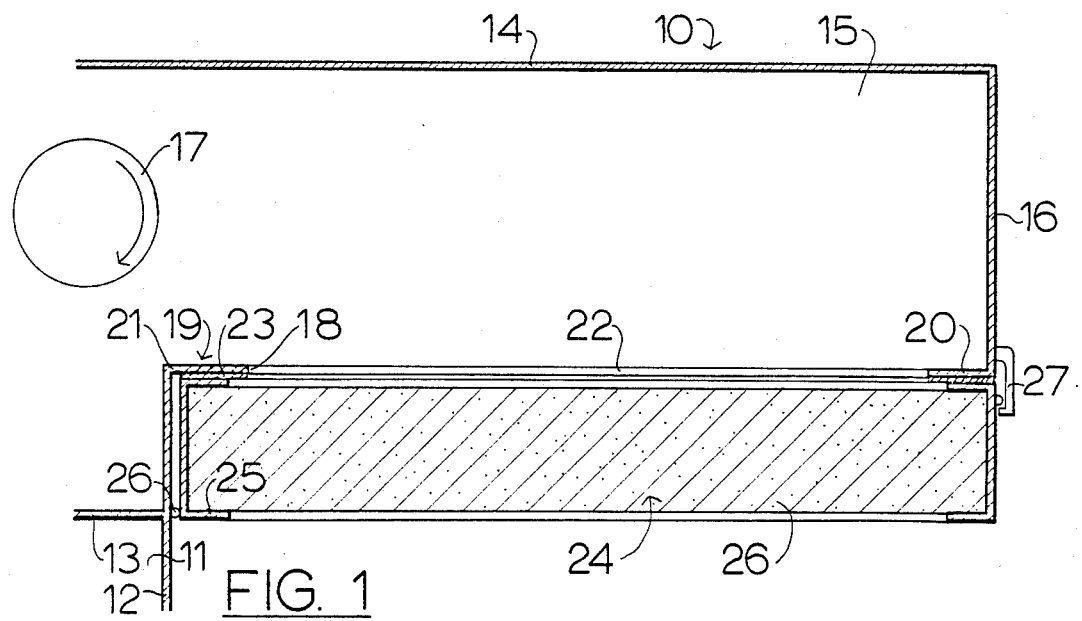
FIG. 1 is a side cross sectional view of a conventional air inlet chamber for use with a cab ventilation system.

An air inlet for a tractor cab is generally indicated at 10 with the cab area indicated at 11 defined by a rear wall 12 and upper wall 13. The inlet is thus positioned above the roof of the cab with the inlet chamber projecting outwardly from the rear wall 12 to receive air in a vertically upward direction alongside the rear wall 12.

Thus the chamber is defined by an upper wall 14 parallel to the upper wall 13 of the cab, a pair of sides, one of which is indicated at 15 at an outer most vertical wall 16 thus defining a rectangular projection on the roof of the cab. A fan is schematically indicated at 17 and is positioned in the roof space for drawing air into the inlet chamber 10 and projecting it into the cab in conventional manner. The details of the air movement from the fan 17 into the cab 11 are of conventional nature and accordingly will not be described or shown in detail herein.

The opening into the inlet chamber 10 is indicated at 18 and is defined by a flange member 19 which fully surround the opening including an outermost portion 20 projecting from the rear wall 16, an inner most portion 21 projecting from the wall 12 and a pair of side portions, one of which is indicated at 22 projecting from the side 15. Beneath the flange member 19 is mounted a sealing ring 23 which fully surround the opening and cooperates with an abutment surface on the underside of the flange 19.

Against the sealing ring 23 is positioned a conventional dust filter 24 formed by an outer frame 25 and a suitable filter medium 26 through which the air passes. The frame 25 is hinged at 26 to the rear wall 12 so that it can be dropped away from the opening 18 for servicing. A latch 27 is positioned on the outer face opposite to the hinge 26 to retain the dust filter 24 in its position abutting against the sealing ring 23 and thus defining an air seal so that all air passes into the chamber through the dust filter 24.

Figure 2:
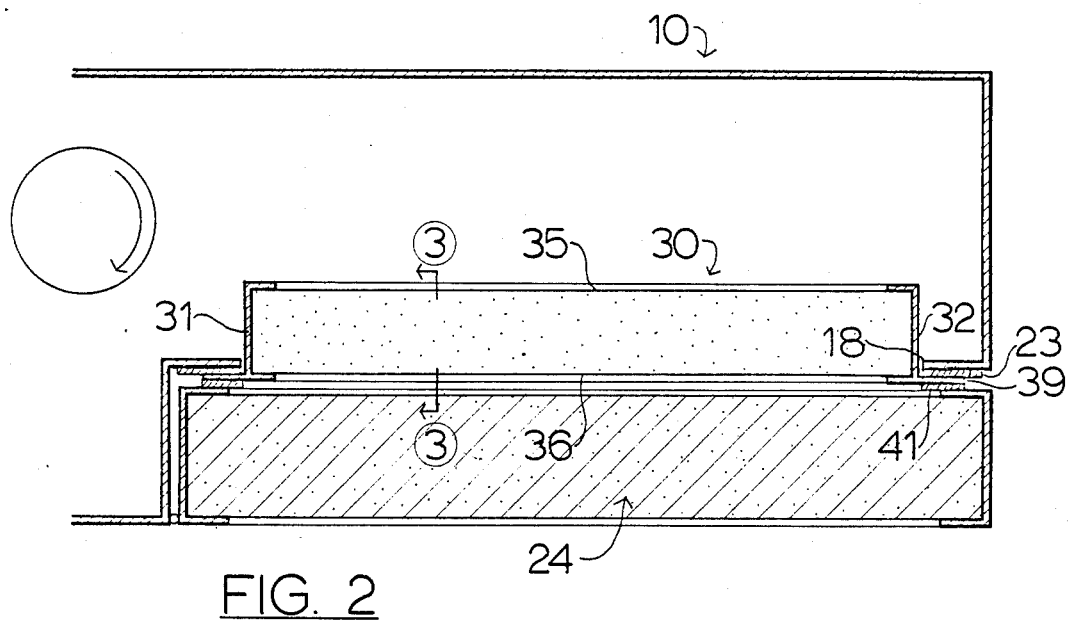
FIG. 2 is a side cross sectional view of the apparatus of FIG. 1 incorporating a chemical filter according to the invention.
Figure 3:
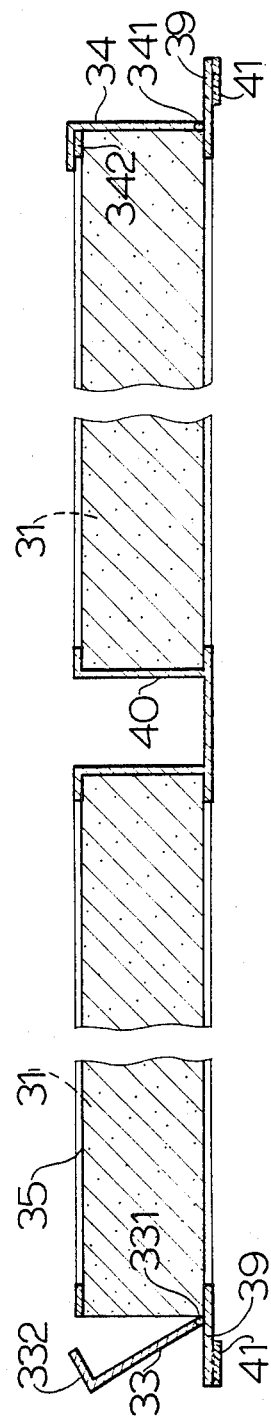
FIG. 3 is a cross sectional view along the line 3—3 of FIG. 2 with the filter removed from the inlet chamber.

Turning now to FIGS. 2 and 3, a filter according to the present invention is shown in place in the inlet chamber 10 of FIG. 1. Thus the chemical filter comprises a housing 30 defined by side walls 31, 32 and end walls 33, 34 thus defining basically a rectangular housing with vertically upstanding walls. End faces of the housing indicated at 35 and 36 lie parallel and spaced by the height of the side walls which is in one example of the order of 1 inch. The end faces 35 and 36 are formed by a surrounding frame area of solid material indicated at 37 and a central screen area 38 formed of a perforated screen of the type which can allow therethrough the passage of air.

Surrounding the lower face 36 is a flang 39 which includes side portions and end portions all co-planar with the end face 36. The flange 39 is formed so that it is integral with the housing and holds the housing in a required position.

For this purpose the flange and housing can be fabricated from steel, tin or other suitable material or can be molded from a plastics material.

The housing is filled with a particulate absorption material for example activated charcoal or alternative materials which are becoming available for example Fluoricil (Trademark) and Tenax (Trademark) or other suitable material. The screen 38 is of a type which can maintain the particulate material within the filter while allowing air to pass through the particulate material in a conventional manner.

To enable the housing to be filled with the particulate material, one end wall 33 comprises a door which is hinged at 331 and includes an upper flange 332 which can engage the end of the housing at the upper wall 35 as a press fit so as to maintain the particulate material within the housing. Thus the particulate material can be emptied from the housing when spent and can be replenished with fresh material as required. As an alternative to the hinged door, the housing can be closed by a plug or bung member.

Figure 4:
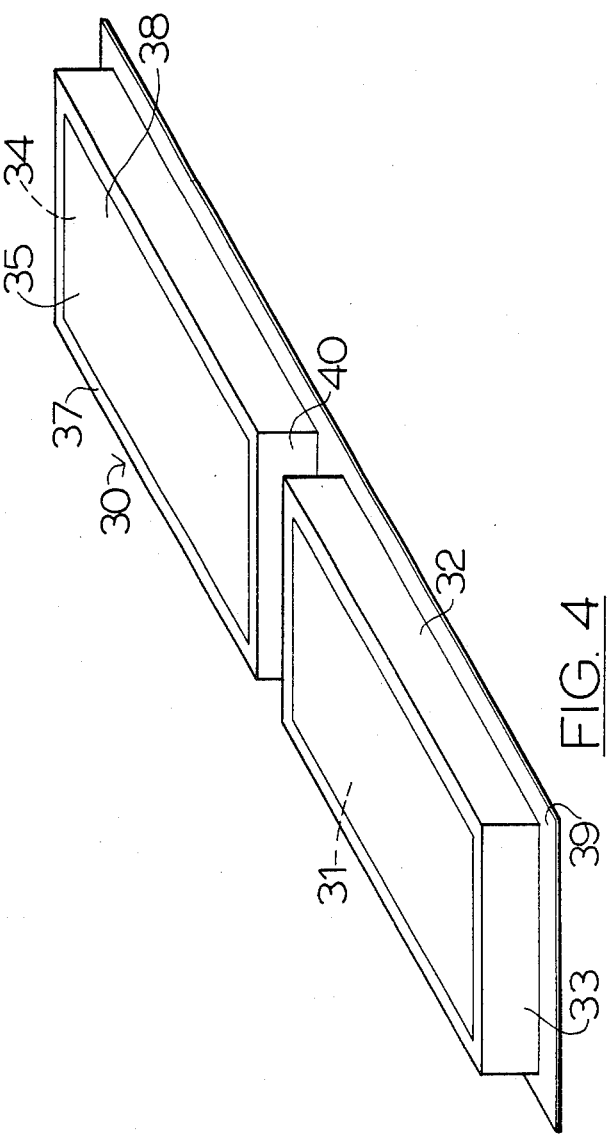
FIG. 4 is an isometric view of the filter of FIGS. 2 and 3.

In the example illustrated in FIGS. 3 and 4, the housing is divided into two separate compartments by a central channel 40 which is required for a particular design of tractor cab which has a central strut across the opening 18 centrally of the opening for structural reasons. In this case the channel is necessary to accommodate the strut and in other cases the housing can comprise a single rectangular housing with parallel upper and lower faces and vertically upstanding side and end walls. In the example illustrated in FIG. 3 the opposite end wall 34 is also formed as a hinged door with a hinge 341 and a matching flange 342. It is illustrated in FIG. 3 in the closed position thus retaining the particulate material within the closed housing compartment.

The underside of the flange 39 carries a resilient sealing ring 41 of rectangular shape thus extending around the whole periphery of the flange 39.

In the installed position illustrated in FIG. 2, it will be noted that the dimensions of the housing that is the length of the side and end walls is such that the housing is sliding fit into the opening 18. However the flange 39 extending around the housing is too large to pass through the opening and thus abuts against the resilient sealing ring 23 in sealing manner. The sealing ring 41 on the underside of the flange 39 in turn cooperates with the upper outer edge of the dust filter 24. Thus the chemical filter is clamped by its flange between the sealing rings and thus into the opening by the dust filter 24. This causes air entering the dust filter to immediately pass through the chemical filter in a simple inexpensive construction while the chemical filter is properly supported in the opening so that all the air drawn in passes both through the dust filter and the chemical filter for proper filtration.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A cab ventilation system comprising a plurality of walls defining an air inlet chamber having a rectangular inlet opening in one of said walls, said one of said walls defining flange means surrounding the opening and defining an abutment surface facing outwardly of the opening and surrounding the opening, first resilient sealing means attached to the abutment surface and surrounding the opening, a dust filter having a rectangular casing having outer dimensions such that an outermost edge of the casing surrounds the opening and lies adjacent the flange means, and filter screen means defined inwardly of the casing, means mounting the casing such that it can be moved from an open position remote from the opening to a closed position in which air drawn into the opening passes through the dust filter, and a solid sorbent filter comprising a container with a length and width arranged to fit into the opening inside the flange means, said container having a thickness receiving therein a solid sorbent filter material, a flange surrounding the container at one face of the container such that the thickness of the container projects into the opening with the flange adjacent said abutment surface and in contact with said first resilient sealing means and second resilient sealing means attached to a surface of said flange remote from said first resilient sealing means and surrounding the container whereby the flange can be inserted between the dust filter and said abutment surface with said first resilient sealing means between said abutment surface and said flange and said second resilient sealing means between the flange and said casing.

2. The invention according to claim 1 wherein the sealing means is attached to the flange on the side thereof remote from the container.

3. The invention according to claim 1 wherein the faces of the container are parallel and wherein said flange means is co-planar with one of said faces.

4. The invention according to claim 1 wherein said faces include perforate screens therein through which air can pass while retaining within the container a particulate absorption material.

5. The invention according to claim 1 wherein the absorption material is chosen from the group consisting of activated charcoal, Fluoricil (Trademark) and Tenax (Trademark).

6. The invention according to claim 1 wherein the dust filter is hinged along one edge to said chamber whereby the filter can be pivoted away from the opening to expose said sorbent filter.

7. The invention according to claim 1 wherein said chamber is mounted on the cab at a position adjacent the roof thereof and extending outwardly to one side thereof and wherein the dust filter and the sorbent filter are arranged in said chamber substantially lying in a horizontal plane and arranged such that air drawn into said chamber moves vertically upwardly through said filters.

8. A cab ventilation system comprising a plurality of walls defining an air inlet chamber having a rectangular inlet opening in one of said walls, said one of said walls defining flange means surrounding the opening and defining an abutment surface facing outwardly of the opening and surrounding the opening, first resilient sealing means attached to the abutment surface and surrounding the opening, a dust filter having a rectangular casing having outer dimensions such that an outermost edge of the casing surrounds the opening and lies adjacent the flange means, and filter screen means defined inwardly of the casing, means mounting the casing such that it can be moved from an open position remote from the opening to a closed position in which air drawn into the opening passes through the dust filter, and a solid sorbent filter comprising a container with a length and width arranged to fit into the opening inside the flange means, said container having a thickness receiving a solid sorbant filter material therein, a flange surrounding the container at one face of the container such that the thickness of the container projects into the opening with the flange adjacent said abutment surface and in contact with said first resilient sealing means and second resilient sealing means attached to a surface of said flange remote from said first resilient sealing means and surrounding the container whereby the flange can be inserted between the dust filter and said abutment surface with said first resilient sealing means between said abutment surface and said flange and said second resilient sealing means between the flange and said casing, wherein one side face of the container includes opening means whereby said solid absorption material in particulate form can be inserted and removed.

9. The invention according to claim 8 wherein said opening means comprises substantially the whole of said side wall and hinge means along one edge of said side wall whereby the side wall can be pivoted to an opened position to allow insertion or release of the particulate material.

* * * * *